Nov. 23, 1948.     W. J. PELTIER ET AL     2,454,613
SUN VISOR
Filed March 26, 1945                    2 Sheets-Sheet 1
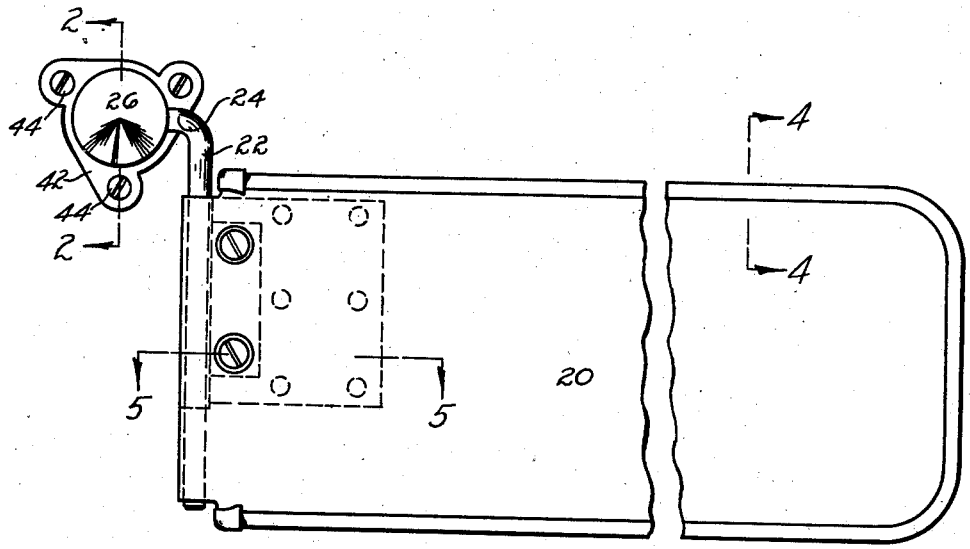
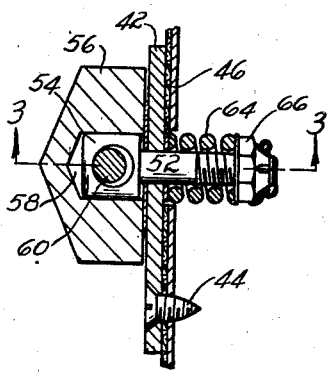
Fig. 2.
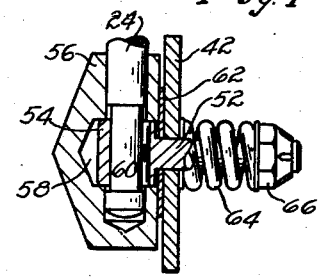
Fig. 3.
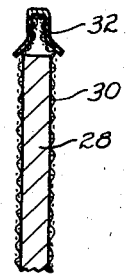
Fig. 4.
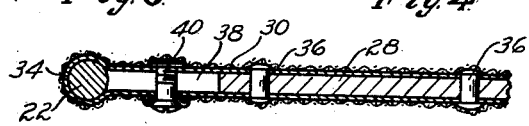
Fig. 5.
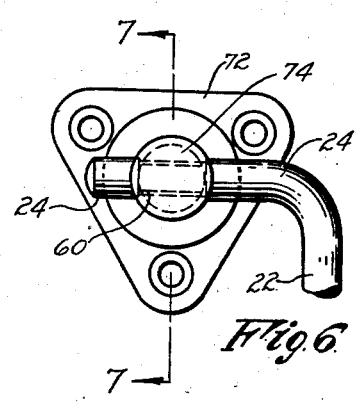
Fig. 6.
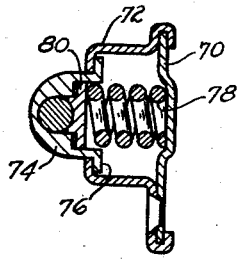
Fig. 7.
INVENTORS
WALTER J. PELTIER &
ALTON J. DIROFF
BY
Parker & Burton
ATTORNEYS Nov. 23, 1948.   W. J. PELTIER ET AL   2,454,613
SUN VISOR Filed March 26, 1945   2 Sheets-Sheet 2

INVENTORS
WALTER J. PELTIER &
BY ALTON J. DIROFF

Parker & Burton
ATTORNEYS

Patented Nov. 23, 1948

2,454,613

UNITED STATES PATENT OFFICE 2,454,613

SUN VISOR

Walter J. Peltier and Alton J. Diroff, Monroe, Mich., assignors to Woodall Industries Incorporated, Detroit, Mich., a corporation of Michigan Application March 26, 1945, Serial No. 584,794

7 Claims. (Cl. 296—97)

This invention relates to improved sun visor mechanism for use in vehicles such as automobiles.

An object is to provide improved sun visor mechanism of simple sturdy inexpensive construction for use in the interior of a vehicle body having a windshield window opening and a side window opening and wherein the visor blade is so supported as to be readily adjustable to a plurality of relatively angular positions before either window opening.

An object is to provide sun visor mechanism of the character described wherein the construction is such that the visor blade may be swung to interpose either the entire blade or selected portions of the blade such as either of the lower corners thereof over selected portions of the windshield. The visor blade may be swung to an out of the way position above the windshield window opening or it may be swung to any one of a substantially unlimited number of relatively angular positions overlying the window windshield opening.

A meritorious feature is that the blade may be swung when in use to snuggle closely against the glass window thereby stabilizing the visor against rattle. In the out of use position the blade may be swung to snuggle closely against the head lining of the vehicle.

Not only is the blade supported for substantially universal angular displacement with respect to either the windshield window opening or the side window opening but it may be swung to rest the outer end of the blade against the steering wheel to serve as a support for a writing pad or the like.

The construction herein disclosed is not only designed to carry out all of the permitted movements set forth in our U. S. Patent 2,424,500 dated July 22, 1947, but the construction of the invention of this application is such that a single spring tends to maintain the visor blade at all of its angular positions of adjustment with respect to either window opening. The visor blade is supported by bracket mechanism for pivotal adjustment about two pivot mountings which always bear angularly with respect to each other and the spring urges the pivotally associated parts together to frictionally maintain different positions of adjustment about both pivot mountings.

More particularly there is a bracket base and a rod support provided with a stud extending through and journaled within the base for rotation to adjusted positions about the axis of the stud and such rod support provides a pivot mounting for one end of an angular rod to rotate about an axis substantially perpendicular with respect to the axis of the stud and a spring is provided which tends to maintain the rod at adjusted positions of rotation with respect to the rod support and to maintain the rod support at adjusted positions of rotation with respect to the base.

Other objects, advantages and meritorious features will more fully appear from the following description, appended claims and accompanying drawing, wherein:

Figure 1 is a broken away elevation of the improved visor assembly.

Figure 2 is a vertical sectional view taken on the line 2—2 of Figure 1.

Figure 3 is a sectional view taken on the line 3—3 of Figure 2.

Figure 4 is a sectional view taken on the line 4—4 of Figure 1.

Figure 5 is a sectional view taken on the line 5—5 of Figure 1.

Figure 6 is an elevation of a modified form of bracket assembly.

Figure 7 is a sectional view taken on the line 7—7 of Figure 6.

Figure 8:
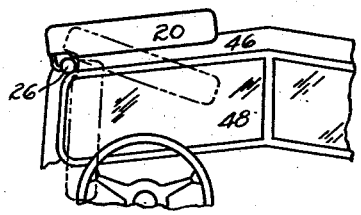
Figure 8 is a diagrammatic elevation of the visor assembly mounted upon the header within the interior of a vehicle body showing the visor blade in solid line in the idle position and in dotted outline in relatively different angular positions of use before the windshield window opening.

The visor assembly herein disclosed is one designed to provide for substantially unlimited angular adjustment of the visor blade to any desired position of use before either the windshield window opening or the side window opening and to provide for longitudinal extensibility of the visor blade before either window opening. Such a visor assembly is also shown in our companion application Serial No. 563,837, hereinabove referred to, but the visor assembly of the instant application differs in construction from the visor assembly of the earlier filed application.

In the drawing the visor blade is indicated as 20. The blade is rotatably journaled upon an end portion 22 of an angular hanger rod. The opposite end 24 of the rod is pivotally mounted for adjustable swinging movement within a bracket assembly 26. This bracket assembly is adapted to be secured to the header of a vehicle body above and adjacent to the windshield window opening and adjacent to the side window opening as shown in the diagrammatic views of Figures 8 through 15. The blade may conveniently consist of a foundation board 28 having covering material 30 extended thereover and secured thereabout by a stitched binding 32.

A tubular pivot mounting 34 is formed by folding a sheet metal plate upon itself overlying the opposite surfaces of one end of the foundation board 28 and secured thereto by rivets 36 or the like underneath the covering 30 all as shown in Figure 5. An end portion of the foundation panel is cut away at 38 and adjusting screws 40 are provided to tighten the walls of the tube 34 about the rod 22 in order that the visor blade may be maintained at desired positions of adjustment to which it has been rotated about the rod end 22.

The opposite end 24 of the angular hanger rod is supported by a bracket assembly 26 for substantially unlimited angular swinging movement. The bracket assembly comprises a base 42 which may be secured by screws 44 to the header 46 of the vehicle body above the windshield window opening 48 and adjacent thereto and adjacent to the side window opening 50.

A rod supporting pin or stud 52 is journaled within the base as shown in Figures 2 and 3. This stud has a head 54 provided with an aperture through which the end 24 of the rod extends. A cap 56 is recessed at 58 to be received over the head of the stud and this cap is provided with an aperture adapted to align with the aperture through the head of the stud to receive the end 24 of the rod. That portion 60 of the rod which extends through the aperture in the stud is shown in Figures 2 and 3 as of reduced diameter thereby preventing endwise displacement of the rod end within the pivot mounting. The adjacent portions of the end 24 of the rod are properly journaled within the pivot mounting in the cap as appears in Figure 3. A friction washer 62 is interposed between the cap 56 and the base 42. A tension spring 64 encircles the inner end of the stud and is held under compression by a nut 66 yieldingly urging the cap toward the base to maintain adjusted positions of rotation about the axis of the stud and urging the pivoted end of the rod to maintain adjusted positions of rotation of the rod within its pivot mounting.

Figure 13:
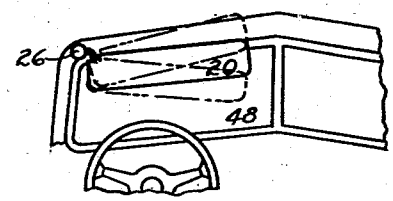
Figure 13 is a diagrammatic elevation of the visor assembly mounted upon the header within the interior of a vehicle body showing the visor blade in solid line in an extended position of use before the windshield window opening and in dotted outline in different angular extended positions.
Figure 9:
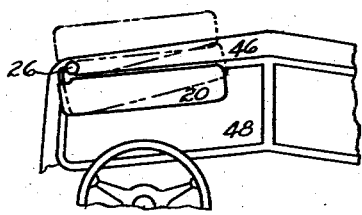
Figure 9 is a diagrammatic elevation of the visor assembly mounted upon the header within the interior of a vehicle body showing the visor blade in solid line in a position of full use before the windshield window opening and in dotted outline in a position of partial use.
Figure 14:
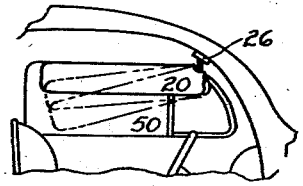
Figure 14 is a diagrammatic elevation of the visor assembly mounted upon the header within the interior of a vehicle body showing the visor blade in solid line in an extended position of use before the side window opening and in dotted outline in different angular positions.
Figure 10:
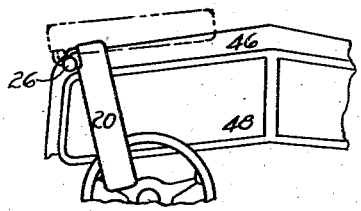
Figure 10 is a diagrammatic elevation of the visor assembly mounted upon the header within the interior of a vehicle body showing the visor blade in solid line in a position of use as a support for a writing pad and in dotted outline in an idle position.
Figure 11:
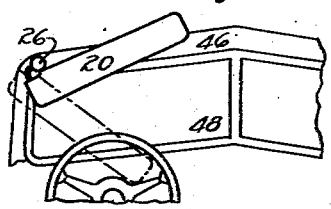
Figure 11 is a diagrammatic elevation of the visor assembly mounted upon the header within the interior of a vehicle body showing the visor blade in solid line in a position of use of the lower left corner before the windshield window opening and in dotted outline in another angular position of use.

The visor rod and blade are pivotally swingable about the pivot mounting of the rod within the cap and stud to swing the visor blade to a position of use before either window opening or to a position of non-use above either window opening. The stud, cap, rod and blade have a permitted unitary pivotal movement about the axis of the stud to a practically unlimited number of angular positions of adjustment of the blade before either the windshield opening or the side window opening. The visor blade is swingable about its pivot mounting upon the end 22 of the rod from a position associated with one window opening to a position associated with the other window opening. The visor blade, rod, cap and stud are swingable as a unit about the axis of the stud to move the visor blade to what is termed a longitudinally extended position such as shown in Figure 13 as compared with the position illustrated in Figure 9. The longitudinal extension distance is measured by the extent of the offset as will be apparent.

The construction disclosed in Figures 6 and 7 represents an alternative to that disclosed in Figures 2 and 3. There is a base member 70 which has a housing or spring enclosure 72 securely attached thereto as shown in Figure 7. This base and housing may be secured to the header by screws such as are used in connection with the base 42 of Figure 2. There is a cap 74 which is rotatably journaled within the housing as shown in Figure 7. This cap has a radial flange 76 that is adapted to be held by a spring 78 against the top of the housing 72 to frictionally maintain the cap at any position to which rotated within the housing.

The cap 74 is provided with a transverse aperture shaped to serve as a pivot mounting for the end 24 of the rod. A plate 80 is held by the spring 78 against that portion of the rod which passes through the cap and this plate has an arcuate rod engaging face which is complementary to the rod engaging face of the cap as shown in Figure 7. The end 24 of the rod has a portion of reduced diameter 60, such as was described in connection with the construction of Figures 2 and 3, and the arcuate face of the plate 80 engages this reduced diameter portion 60 of the rod and holds the rod against axial displacement.

In each of the constructions of Figures 2 and 7 the single spring not only holds the rod at positions of adjusted rotation with respect to the cap but also holds the cap at positions of adjusted rotation with respect to the base. In each of these constructions the visor blade is swingable about the rod end 22 from a position of association with the windshield to a position of association with the side window. In each construction the visor blade is swingable from a position of use in front of either window to a position of non-use above the window and is furthermore adjustable to a practically unlimited number of relative angular positions before either window.

Figure 15:
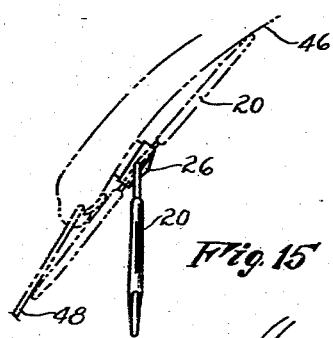
Figure 15 is a diagrammatic elevation of the visor assembly mounted upon the header within the interior of a vehicle body showing the visor blade in solid line in position of being swung either to a position of use overlying the windshield window or to a position of non-use overlying the header, which latter positions are shown in dotted outline.
Figure 12:
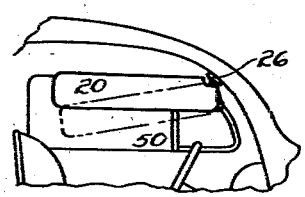
Figure 12 is a diagrammatic elevation of the visor assembly mounted upon the header within the interior of a vehicle body showing the visor blade in solid line in full use before the side window opening and in dotted outline in an angular position of partial use.
Figure 16:
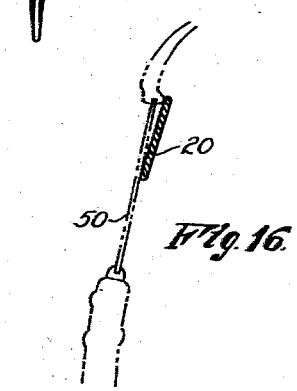
Figure 16 is a diagrammatic elevation of the visor assembly mounted upon the header within the interior of a vehicle body showing the visor blade in cross section and lying against the side window.

Due to the capacity for angular adjustment it is possible to so position the visor blade as to obstruct the rays of the sun entering at a particular point through the window without obstructing the vision through a large area of the window. Furthermore it is possible to position the blade substantially flat against the window pane or the header as shown in Figures 15 and 16. The outer margin of the blade will rest against the pane as to hold the blade against vibration or rattle. Some of the different angular positions to which the blade may be adjusted are shown in the figures of the drawing. These figures indicate how selected corners of the blade may be interposed to obstruct light rays passing through the glass pane at certain points and how selected portions of the pane may be obstructed without obstructing other portions.

What we claim is:

1. Sun visor mechanism comprising, in combination, a bracket base, a rod support pivoted upon the base substantially perpendicular to the plane of the base for rotatable adjustment to a plurality of positions with respect to the base, an angular visor blade supporting rod having one end pivoted upon the rod support for rotatable adjustment about an axis substantially perpendicular to the axis of the pivot mounting of the rod support upon the base, spring means exerting pressure upon the rod tending to hold it at adjusted positions of rotation with respect to the rod support and tending to hold the rod support at adjusted positions of rotation with respect to the base and a visor blade pivotally mounted upon the opposite end of the rod for rotation about an axis perpendicular to the axis of the pivot mounting of the rod upon the rod support.

2. Sun visor mechanism comprising, in combination, a bracket base, a rod support pivoted upon the base for rotatable adjustment about an axis perpendicular to the plane of the base to a plurality of positions with respect to the base, an angular hanger rod pivoted upon the rod support for rotatable adjustment about an axis extending angularly with respect to the pivotal axis of the rod support upon the base, said rod support comprising a pair of rod engaging members, a spring exerting spring pressure upon said members tending to hold said members in engagement with the rod to maintain the rod at adjusted positions of rotation with respect to the rod support and tending to hold the rod support at adjusted positions of rotation with respect to the base and a visor blade pivoted upon the rod for rotatable adjustment thereover about an axis perpendicular to the axis of rotation of the rod upon the rod support.

3. Sun visor mechanism comprising, in combination, a bracket base having an open top spring housing, a rod supporting cap rotatably mounted within the open top of the housing, said cap provided with a pivot mounting for one end of a hanger rod, a hanger rod having one end received within said pivot mounting, spring means within the housing exerting spring pressure upon the rod to frictionally maintain the same at adjusted position of rotation within the mounting of the cap and exerting spring pressure through the rod upon the cap to frictionally maintain adjusted positions of rotation of the cap with respect to the base.

4. Sun visor mechanism comprising, in combination, a bracket base having a spring housing provided with an opening at the top, a rod supporting cap rotatably mounted within the opening in the housing and provided with a flange portion bearing frictionally against the wall of the housing, said cap provided with a pivot mounting for a visor blade supporting rod, a visor blade supporting rod having one end journaled within the pivot mounting in the cap and spring means disposed within the housing having one end bearing against the base and the opposite end bearing against the rod and exerting spring pressure upon the rod to frictionally maintain the rod at adjusted positions of rotation within the mounting in the cap and to frictionally urge the flange portion of the cap against the housing to maintain the cap at adjusted positions of rotation with respect to the base.

5. Sun visor mechanism comprising, in combination, a bracket base, a rod supporting assembly comprising a hollow cap provided with a pair of aligned pivot mountings and a stud having a head at one end disposed within the interior of the cap and provided with a pivot mounting disposed between the pivot mountings of the cap and aligned therewith, an angular visor blade supporting rod having one end journaled within said pivot mountings of the cap and stud, said pivot mountings being disposed perpendicularly with respect to the axis of the stud, said stud extending through and journaled within the bracket base perpendicularly to the plane of the base for rotation of the cap and stud relative to the base about the axis of the stud and a spring encircling the stud and bearing at one end thereagainst and at the opposite end against the base yieldingly urging the stud to hold the cap toward the base to frictionally maintain adjusted positions of rotation of the cap and stud relative to the base and yieldingly urging the stud relative to the cap to frictionally bind the rod therebetween to maintain the rod at adjusted positions of rotation within the pivot mountings of the cap and stud.

6. Sun visor mechanism comprising, in combination, a bracket base, a rod support pivoted upon the base for rotatable adjustment about an axis perpendicular to the plane of the base to a pluarity of positions with respect to the base, an angular hanger rod pivoted upon the rod support for rotatable adjustment about an axis extending angularly with respect to the pivotal axis of the rod support upon the base, said rod support comprising a pair of rod engaging members, one of said members being in the form of a pin extending rotatably through the base and provided with an aperture to receive the hanger rod, said hanger rod having one end extending rotatably through the aperture of the pin and having a bearing therein and against the other member of said pair, a spring encircling said pin on the opposite side of the base and exerting pressure on the pin tending to hold the hanger rod between said members to maintain adjusted positions of rotation therebetween, said spring also exerting pressure on the pin tending to hold the rod support yieldingly toward the base to maintain adjusted positions of rotation with respect to the base and a visor blade mounted upon the rod for rotatable adjustment thereof about an axis perpendicular to the axis of rotation of the rod upon the rod support.

7. Sun visor mechanism comprising, in combination, a bracket base, a rod support pivoted upon the base for rotatable adjustment about an axis perpendicular to the plane of the base to a plurality of positions with respect to the base, an angular hanger rod pivoted upon the rod support for rotatable adjustment about an axis extending angularly with respect to the pivotal axis of the rod support upon the base, said rod support comprising a pair of rod engaging members, one of said members being a part provided with a pair of opposed seats for the hanger rod, the other member being a pin extending rotatably through the base and having an apertured head disposed between the hanger rod seats of the first member, said hanger rod having one end extending rotatably through the apertured head of the pin and seated on opposite sides of head within the hanger rod seats of the first member, a spring encircling the pin and exerting pressure thereon holding the hanger rod frictionally against the seats of the first member to maintain the rod at adjusted positions of rotation with respect to the rod support, said spring also tending to hold the first member yieldingly toward the base to maintain adjusted positions of rotation with respect to the base and a visor blade pivoted upon the rod for rotatable adjustment thereof about an axis perpendicular to the axis of rotation of the rod upon the rod support.

WALTER J. PELTIER.
ALTON J. DIROFF.

REFERENCES CITED

The following references are of record in the file of this patent:

UNITED STATES PATENTS

| Number | Name | Date |
| --- | --- | --- |
| 1,772,233 | Vivier | Aug. 5, 1930 |
| 1,932,697 | Jankovic | Oct. 31, 1933 |
| 2,057,009 | Chadwick | Oct. 13, 1936 |
| 2,112,464 | Jacobs | Mar. 29, 1938 |
| 2,220,429 | Soderberg | Nov. 5, 1940 |
| 2,294,317 | Pelcher et al. | Aug. 25, 1942 |
| 2,305,584 | Arbron | Dec. 22, 1942 |